A. G. SPENCER.
BUFFER AND OTHER SPRING CONSTRUCTED WITH INDIA RUBBER.
APPLICATION FILED MAY 14, 1910.
971,415.
Patented Sept. 27, 1910.
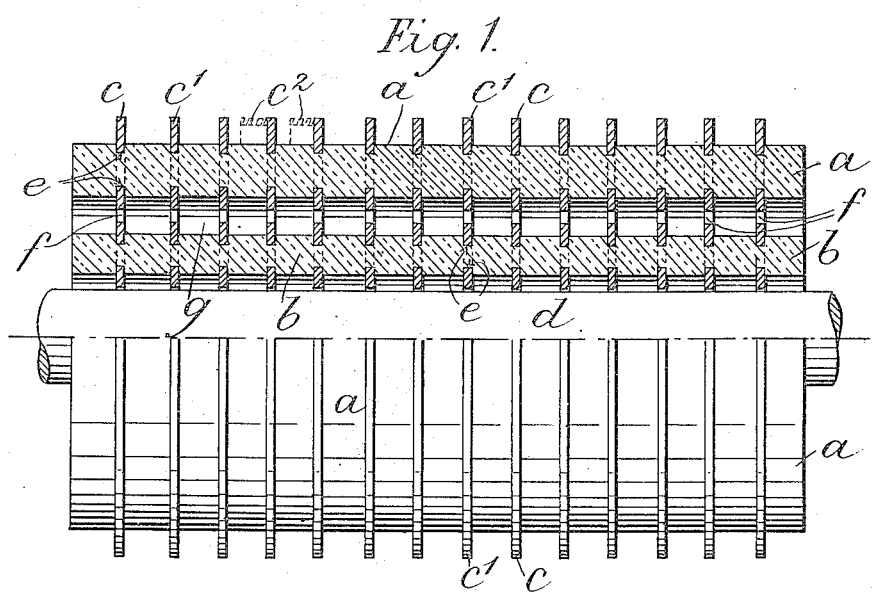
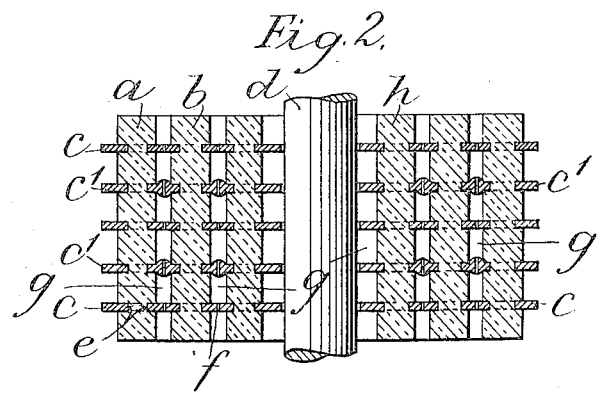

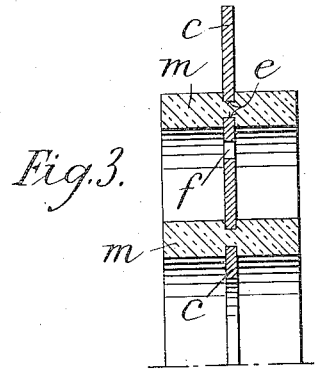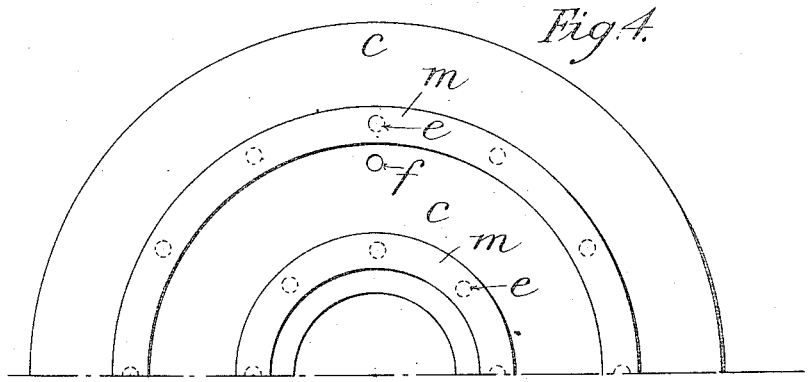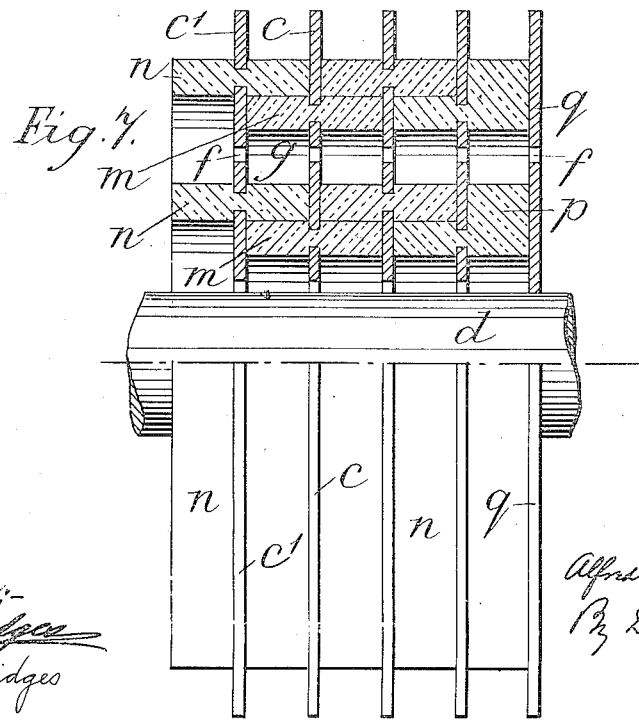

A. G. SPENCER.
BUFFER AND OTHER SPRING CONSTRUCTED WITH INDIA RUBBER.
APPLICATION FILED MAY 14, 1910.
971,415.
Patented Sept. 27, 1910.
4 SHEETS—SHEET 3.
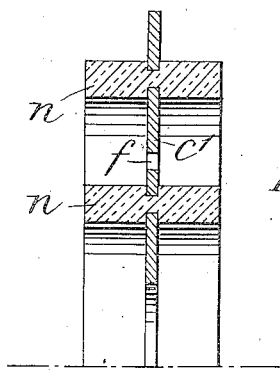
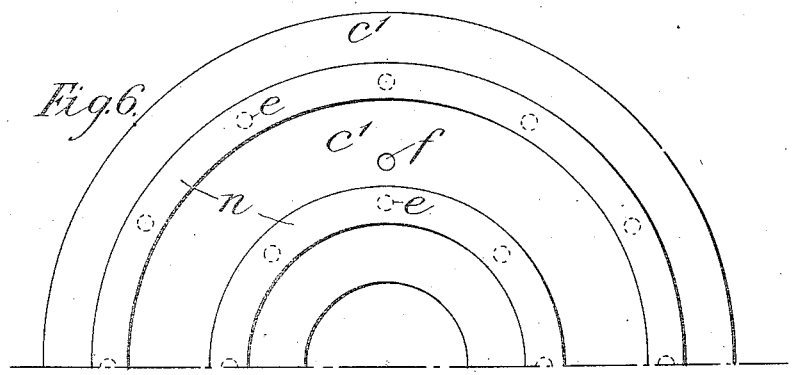
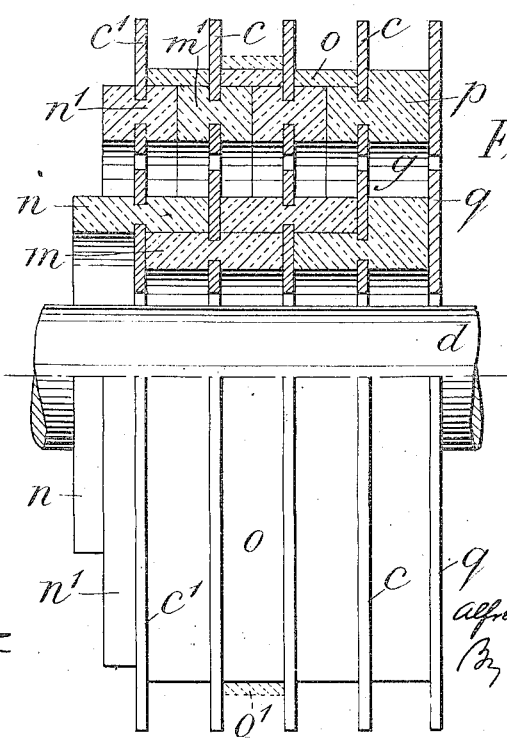

A. G. SPENCER.
BUFFER AND OTHER SPRING CONSTRUCTED WITH INDIA RUBBER.
APPLICATION FILED MAY 14, 1910.
971,415.
Patented Sept. 27, 1910.
4 SHEETS—SHEET 4.
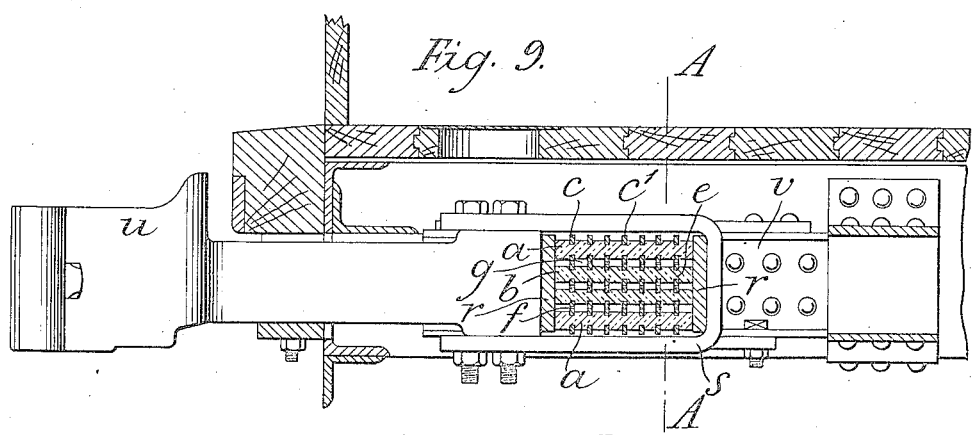
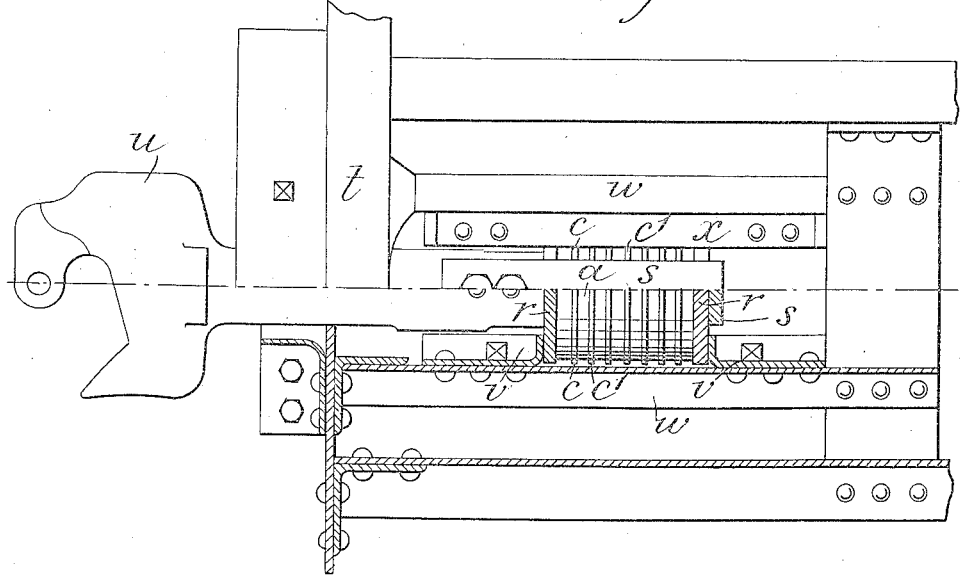
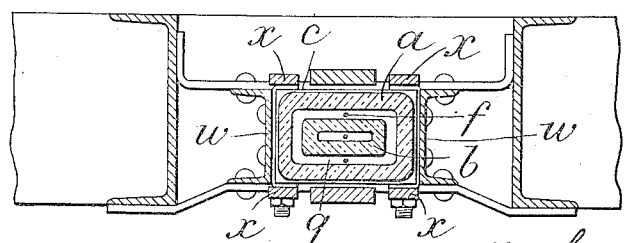

UNITED STATES PATENT OFFICE.

ALFRED GEORGE SPENCER, OF LONDON, ENGLAND.

BUFFER AND OTHER SPRING CONSTRUCTED WITH INDIA-RUBBER.

971,415.         Specification of Letters Patent.     Patented Sept. 27, 1910.

Application filed May 14, 1910. Serial No. 561,428.

*To all whom it may concern:*

Be it known that I, ALFRED GEORGE SPENCER, a subject of the King of Great Britain and Ireland, residing at London, England, have invented Improvements in and Relating to Buffer and other Springs Constructed with India-Rubber, of which the following is a specification.

This invention relates to buffer and other springs of the kind comprising annular or ring-like india rubber bodies of circular or other form arranged one within the other a short distance apart and rings or perforated plates molded into them in such way as to connect the india rubber bodies and to retain them the desired distance apart which distance is in some cases such that when the spring is in compression the lateral portions of the rubber bodies bear against one another or against the rod, if any, passing through the spring, or against the confining or cup ring or rings when such are used, thereby offering resistance but without however undue pressure being exerted against the said parts then in contact.

In use springs of the kind under notice generally comprise a number of elements each consisting of two or more such india rubber bodies arranged one within the other a short distance apart and one or more perforated metal plates or rings molded into them, a separating ring or plate of metal being arranged between each such spring element and the adjacent one. Employed in this manner such springs have been proved to be most efficient for the purpose for which they are designed and to effectively retain their resiliency after long periods of use but it is sometimes found in practice that owing to negligence or ignorance on the part of the persons assembling the various elements, the metal separating rings or plates or one or more of them are omitted with the result that the rubber bodies of two adjacent spring elements are in contact and the buffing or drawing effect is not that for which the compound spring is designed; moreover, when the compression occurs the rubber bodies are damaged. In some cases in fact the rubber bodies of one element of a pair of elements from between which a separating plate has been omitted have been completely torn off their metal holding plate after a time and when such an event has taken place the fact of a separating plate being omitted is not apparent upon merely looking at the spring and the fault may not be discovered in time to avoid the serious consequences of insufficient cushioning.

According to this invention, a compound buffer or other spring of the type set forth can be produced without any of the parts being separable. For this purpose in the new or improved method of manufacturing such springs, spring elements, each comprising annular or ring-like india rubber bodies of circular or other form arranged one within the other a short distance apart and a ring or rings or a perforated plate or plates molded into them, are produced by partially curing or vulcanizing the india rubber when the rings or plates are in position, in any known manner, a desired number of such elements are then placed together end to end with a perforated separating plate or ring or rings between each element and the adjacent ones, and the operation of curing or vulcanizing the india rubber is then completed so that the separating plates or rings become securely held in the india rubber. Or each of the india rubber bodies between two adjacent metal plates of a compound spring of the type set forth can be built up of annular or ring-like parts of circular or other form one or some of which is or are connected to one of such holding plates and another or others of which is or are connected to the other holding plate, another annular or ring-like part or other parts being, in some cases, provided, that may be connected or not to either holding plate, the various parts of each india rubber body being of any desired shape in cross section but such that when assembled to constitute a complete india rubber body, the cross sectional area of such body will correspond to that heretofore usual or necessary to suit the desired purpose for which the spring is to be used.

The several parts of each compound india rubber body may merely fit one another, or the adjacent surfaces of the co-acting parts may be secured together by any suitable adhesive, or by a vulcanizing process.

A buffer or other spring according to this invention and which can be manufactured according to the new or improved method described comprises two or more ring-like or tubular rubber bodies of circular or other form, arranged one within the other a short distance apart and a number of perforated plates or rings held in the rubber bodies, the several rubber bodies constituting the spring being inseparable and arranged in such way as to form, with the holding plates or rings, spaces or chambers in the body of the spring that correspond to the spaces formed by and between the rubber bodies, the plates molded therein, and the separating plates of compound springs of the kind hereinbefore referred to.

Figure 1 shows partly in central vertical section and partly in elevation a spring according to this invention suitable for use as a buffer or draw spring for railway vehicles. Fig. 2 is a similar view to Fig. 1 showing another construction of the improved spring suitable for a bearing spring for a railway carriage or other vehicle. Figs. 3 and 4 show in central vertical section and in elevation respectively one-half of an element of another spring embodying this invention. Figs. 5 and 6 are similar views to Figs. 3 and 4 of another element of such spring. Fig. 7 shows a portion of the complete spring partly in central longitudinal vertical section and partly in elevation. Fig. 8 is a similar view to Fig. 7 illustrating another construction of spring according to this invention. Fig. 9 shows partly in central vertical section a combined buffing and draw spring according to this invention. Fig. 10 illustrates the arrangement shown in Fig. 9 partly in plan and partly in central horizontal section. Fig. 11 is a transverse section corresponding to the line A, A of Fig. 9.

Referring to Fig. 1, $a$ and $b$ are cylinders of india rubber, and $c$ and $c^1$ are perforated rings or plates of metal securely held in the rubber. Such a spring is adapted to be threaded on a rod $d$, as shown, between thrust transmitting plates or abutments, not shown. The rubber of the cylinders $a$ and $b$ extends through the perforations $e$ of the metal plates $c$ and $c^1$ and such plates hold the rubber cylinders the desired distance apart. Between the rubber cylinders the plates $c$ and $c^1$ can be formed with other perforations $f$ that allow air to freely pass to and from the several annular spaces or chambers $g$ formed by and between the rubber cylinders $a$ and $b$ and the metal plates $c$ and $c^1$. In some cases the metal plates $c$ and $c^1$ or some of them can be cupped or formed with marginal flanges, as indicated in dotted lines at $c^2$, that confine the outer cylinder $a$ and limit its expansion under compression.

The spring shown in Fig. 2 comprises three cylinders of india rubber $a$, $b$ and $h$, otherwise it is constructed similarly to the spring shown in Fig. 1 and corresponding parts are indicated by the same reference letters.

In the construction of spring shown in Figs. 5, 6 and 7, india rubber part rings $m$ of one spring element, Figs. 3 and 4, are carried by and project laterally from a metal plate $c$ and fit into the india rubber part rings $n$ carried by the metal plate $c^1$ of the next adjacent spring element, Figs. 5 and 6, the part rings $m$ and $n$ of each spring element bearing against the metal carrying plate $c$ or $c^1$ of the adjacent spring element. Each india rubber part ring $m$ and $n$ is of less radial thickness than heretofore usual in springs of the type referred to and such that the combined radial thickness of each pair of juxtaposed india rubber part rings $m$ and $n$ is say about equal to that of each ring in the usual constructions of springs of the type referred to, or such as is necessary to suit any desired requirement. Any suitable number of spring elements constructed as described may be simply fitted one into the other as set forth and as shown in Figs. 7, to form a compound spring of any required length. Or the co-acting india rubber part rings $m$ and $n$ may be secured together as hereinbefore set forth to form a compound spring.

In the construction of spring shown in Fig. 8 the india rubber part rings $m^1$ and $n^1$ nearest the outer periphery of the metal plates $c$ and $c^1$ are each made of half the axial length heretofore usual and arranged to abut one against the other, and around them is placed another india rubber ring $o$ of less radial thickness than the india rubber rings $m^1$ and $n^1$ it embraces but the axial length of which corresponds to that of the two india rubber rings $m^1$, $n^1$ so that it extends from the metal plate $c$ of one spring element to the metal plate $c^1$ of the adjacent spring element. The embracing ring $o$ may be formed of vulcanized rubber, or it may be vulcanized when in position, for which latter purpose a metal clamping ring $o^1$ made in halves connected together as by bolts, can be placed around the embracing ring $o$ when in position and the latter ring be then vulcanized in any suitable manner, after which the metal clamping ring is removed. The other or inner india rubber rings $m$ and $n$ of the adjacent springs may fit one into the other as shown and already described in connection with Fig. 7. The india rubber rings $p$ of the end springs may be of the heretofore usual cross section and abut against plain metal plates $q$ as heretofore.

The india rubber ring-like or tubular bodies of the spring shown in Figs. 9, 10 and 11 are of oblong form with rounded corners, see Fig. 11, and the complete spring is adapted to be placed between thrust plates $r$ which with the spring are embraced by a stirrup-shaped holder $s$ fixed to the inner end of a drawbar or rod that extends through the headstock $t$ of a railway wagon, the outer end being provided with a knuckle coupling head $u$ which may be of the well known "Janney" type. Brackets $v$ riveted to the longitudinal members $w$ of the underframe form stops for the thrust plates $r$, and bars $x$ fixed to the brackets $v$ constitute top and bottom guides for the spring which is guided in a lateral direction by the members $w$. The spring shown in this arrangement is manufactured by the same method as is described with reference to Fig. 1 but as will be understood a spring of the form shown can if desired be constructed as hereinbefore described with reference to Fig. 7 or to Fig. 8.

The india rubber bodies of springs according to this invention can be of any desired cross section. As will be understood the springs shown are merely given by way of example and the number of india rubber ring-like or tubular bodies, the number of plates or rings held therein and the cross section of the part rubber ring-like or tubular bodies, located between the holding plates or rings can be other than as shown without departure from this invention. It will also be understood that any of the springs shown can be manufactured according to the improved method hereinbefore set forth, that is to say, elements each comprising a plate $c$ having annular ring-like bodies of rubber on each side of it can be first made by partially curing the rubber with the plate in position, the desired number of such elements and the plates $c^1$ being then assembled and placed in position and the whole secured together by completing the curing or vulcanizing operation in any suitable well known manner.

In the claims, where referring to the india rubber bodies, the term ring-like body is intended to include annular or ring-like bodies of circular or other form, and where referring to the holding rings or plates the term plate or plates is intended to also include ring or rings.

What I claim is:—

1. The hereinbefore described method of manufacturing buffer or other springs according to which spring elements, each comprising ring-like india rubber bodies arranged one within the other a short distance apart and a plate molded into them, are produced by partially curing the india rubber when the plate is in position, in any known manner, a desired number of such elements being then placed together end to end with a perforated plate between each element and the adjacent ones, and the operation of curing the india rubber then completed so that all the perforated plates become securely held in the india rubber.

2. The hereinbefore described method of manufacturing buffer or other springs according to which spring elements, each comprising ring-like india rubber bodies arranged one within the other a short distance apart and a metal plate molded into them, are produced by partially curing the india rubber when the plate is in position, in any known manner, a desired number of such elements being then placed together end to end with a perforated plate between each element and the adjacent ones, and the operation of curing the india rubber then completed so that all the perforated metal plates become securely held in the india rubber.

3. A spring comprising holding plates and rubber bodies between two adjacent plates, such rubber bodies being of ring-like form arranged one within the other a short distance apart and each said rubber body comprising ring-like parts one of which is connected to one of said plates and another to the adjacent said plate.

4. A spring comprising holding plates and rubber bodies between two adjacent plates, such rubber bodies being of ring-like form arranged one within the other a short distance apart and each said rubber body comprising ring-like parts one of which is connected to one of said plates, another of which is connected to the adjacent plate and another of which is not connected to any of said plates.

5. A spring comprising metal holding plates and rubber bodies between two adjacent plates, such rubber bodies being of ring like form arranged one within the other a short distance apart and each said rubber body comprising ring-like parts one of which is connected to one of said plates and another to the adjacent said plate.

6. A spring comprising holding plates and rubber bodies between two adjacent plates, such rubber bodies being of ring-like form arranged one within the other a short distance apart and each said rubber body comprising ring-like parts secured together one of which is connected to one of said plates and another to the adjacent said plate.

7. A spring comprising holding plates and rubber bodies between two adjacent plates, such rubber bodies being of ring-like form arranged one within the other a short distance apart and each said rubber body comprising ring-like parts secured together, one of which is connected to one of said plates, another of which is connected to the adjacent plate and another of which is not connected to any of said plates.

8. A spring comprising two or more tubular bodies of rubber arranged one within the other a short distance apart and a number of perforated plates held in the rubber bodies, the several rubber bodies constituting the spring being inseparable and the plates being spaced apart to form air chambers between the said rubber bodies.

9. A spring comprising two or more tubular bodies of rubber arranged one within the other a short distance apart and a number of perforated metal plates held in the rubber bodies, the several rubber bodies constituting the spring being inseparable and the plates being spaced apart to form air chambers between the said rubber bodies.

10. A spring comprising a number of tubular bodies of rubber arranged one within the other a short distance apart, and perforated metal plates molded into said rubber bodies, some of the perforations of said plates being located in those portions of the plates located between the rubber bodies.

11. A spring arrangement comprising a number of spring elements each consisting of a number of ring-like bodies of oblong form with rounded corners arranged one within the other a short distance apart and a perforated metal plate molded into them, plates also of oblong form with rounded corners arranged between each said element and the adjacent one, and a holder for said spring elements.

Signed at London, England, this third day of May 1910.

ALFRED GEORGE SPENCER.

Witnesses:
RICHARD T. GLASCODINE,
HERBERT D. JAMESON.